United States Patent [19]
Garneau, Sr.

[11] Patent Number: 5,699,614
[45] Date of Patent: Dec. 23, 1997

[54] ATTACHABLE AND REMOVABLE HANDLE FOR FOOD SERVING UTENSILS

[76] Inventor: John P. Garneau, Sr., P.O. Box 50009, Lighthouse Point, Fla. 33064

[21] Appl. No.: 511,374

[22] Filed: Aug. 4, 1995

[51] Int. Cl.[6] ........................................ A47J 43/28
[52] U.S. Cl. .................. 30/142; 30/150; 30/323; 30/327
[58] Field of Search ............. 30/322–329, 140–145, 30/147–150, 337; 16/114 R

[56] References Cited

U.S. PATENT DOCUMENTS

| | | |
|---|---|---|
| 986,761 | 3/1911 | Roscoe. |
| 1,106,809 | 8/1914 | Haverty et al. |
| 2,254,571 | 9/1941 | Hailey ................................ 16/116 |
| 2,262,273 | 11/1941 | Ferrara ............................... 294/31 |
| 2,275,875 | 3/1942 | Werfel ................................ 16/114 |
| 2,853,780 | 9/1958 | Bull ................................... 30/327 |
| 3,186,088 | 6/1965 | Lingenfelter ................... 30/340 X |
| 3,815,175 | 6/1974 | Szabados, Nee Borbas ......... 16/114 |
| 3,858,320 | 1/1975 | Neal et al. ..................... 30/326 X |
| 4,646,405 | 3/1987 | Reinhold ........................... 30/329 |
| 4,779,344 | 10/1988 | Panisch ............................. 30/326 |
| 4,782,555 | 11/1988 | Fischhbach ........................ 16/110 |
| 4,794,666 | 1/1989 | Kim .................................. 16/114 |
| 4,926,522 | 5/1990 | Wang ................................ 16/114 |
| 4,965,907 | 10/1990 | Baumgarten ....................... 16/114 |
| 5,131,151 | 7/1992 | Agase et al. ....................... 30/327 |
| 5,251,758 | 10/1993 | Kolacek ........................... 206/542 |
| 5,479,708 | 1/1996 | Thomas ......................... 30/322 X |

FOREIGN PATENT DOCUMENTS

| | | | |
|---|---|---|---|
| 1151001 | 1/1958 | France ............................. 30/327 |

OTHER PUBLICATIONS

Copy of Official Gazette p. 1096 dated Dec. 22, 1959 for U.S. Design Patent No. 186,927, entitled "Covered Food Serving Table".

*Primary Examiner*—Douglas D. Watts
*Attorney, Agent, or Firm*—Webb Ziesenheim Bruening Logsdon Orkin & Hanson, P.C.

[57] ABSTRACT

A utensil having a first portion and a handle. The first portion includes a utensil portion, which can be spoon shaped, forked shaped, knife shaped or other food implement shaped, and a shank attached at one end to the utensil portion. The handle is removably attached to another end of the shank. A spring loaded clamp is provided with the handle to coact with the shank so as to engage the shank with the handle. The utensil is particularly well adapted to be used with buffets, whereby first portions of utensils are provided with buffet dishes and handles are provided for the customers of the buffet. A clip can be provided for attaching to a buffet dish and holding the utensil first portion.

22 Claims, 11 Drawing Sheets

ATTACHABLE AND REMOVABLE HANDLE FOR FOOD SERVING UTENSILS

BACKGROUND OF THE INVENTION

1. Field of the Invention

This invention relates to food serving utensils, and more particularly, food utensils for use with food buffets.

2. Description of the Prior Art

During the past twenty years, Americans have seen the increase of both spouses entering the work force. This has resulted in an increase in spendable income for the family. This increase in income permits the family to enjoy such luxuries as two cars, color televisions and luxurious vacations. Also, Americans, in general, are spending more time away from home for both work and pleasure. As a result, more people are eating their meals in restaurants.

Buffets are one of the most popular forms of restaurants. Buffets typically include many different types of appetizers, salads, entrees and desserts placed in food trays along a buffet table.

Spoons or forks are generally provided with each buffet dish. The customer or patron uses the utensils to remove as much food as he or she desires from the buffet dish onto their plate and then places the utensils back into the buffet dish. The patron continues this process throughout the buffet table, and then goes to his or her seat to eat the food using food utensils provided by the restaurant.

Sanitation has always been a concern of buffet restaurant owners, as well as the restaurant customers. Restaurant owners are well aware of the economical and devastating effect that results from an outbreak of food poisoning in a restaurant.

Great progress has been made in mandating the supervision of food preparation and employees' personal hygiene within the restaurant industry in order to safeguard the future of the dining out segment of the food service industry. However, this is not good enough, since customer cross-contamination is also possible in the buffet environment by various customers using the same buffet food utensils and breathing onto the buffet food.

The food service industry specifically addressed the latter concern by including buffet sneeze guards over the buffet tables (see for example, Applicant's U.S. Design Pat. No. 186,927). However, the cross-contamination of customers has never been addressed. It is known that Streptococcal, E.Coli and Staph bacteria congregate on human hands and may be passed among customers using the same utensils. Also, Hepatitis A may likewise be passed among customers in the same manner. Furthermore, the bacteria and virus also can contact the food, thereby contaminating the food.

To overcome this cross-contamination problem, it has been proposed to issue disposable gloves to buffet customers. However, use of such gloves has been rejected for several reasons, namely: (1) the patron's resentment of the inference that they have unclean hands; (2) the unwillingness of the patron to wear disposable gloves; (3) the inconvenience of putting on and removing the gloves while holding a plate of food, plus the awkward appearance of everyone wearing gloves; and (4) the gloves are easily contaminated by touching other items, thereby giving the wearer a false sense of security.

It has also been suggested that the patron be issued his or her own utensils for use only with the buffet dishes. However, this would require an inordinate number of serving utensils and is, therefore, not practical. Likewise, it has been suggested that a sanitation box be provided for use with the buffet utensils before removing food from the buffet dishes. This too is impractical and would be tremendously confusing to the customer.

Therefore, it is an object of my invention to provide a simple, effective, efficient, aesthetically pleasing and inexpensive solution to prevent customer cross-contamination of buffet utensils.

SUMMARY OF THE INVENTION

My invention is a buffet utensil that includes a utensil portion (such as a spoon, fork, knife or other food implement shape) secured to an end of a shank. A coupling, such as a splined coupling, is provided at the other end of the shank. A handle is provided having an open end and defining a cavity adapted to matingly receive the coupling. A spring loaded clamp is provided on the handle to engage the shank.

The handle is adapted to be removably secured to the shank. Initially, the clamp is maintained in an open position and matingly receives the splined coupling within the cavity. The clamp is then maintained in a closed position thereby removably securing the handle to the shank. The above process is reversed to disengage the handle from or engaging the shank.

In the buffet setting, each buffet dish includes a first portion of the utensil, which includes the utensil portion and the shank. Before starting down the buffet table, each customer is issued their own detachable handle which easily clamps onto all of the serving utensils already on the buffet table. The detachable handle stays with the customer for his or her entire trip around the buffet table. This customer is the only person who touches the handle as he or she serves themselves from the buffet table. The customer engages the handle with the shank as described above for only those utensil first portions contained within buffet dishes he or she desires food from. The customer places the food on their plate and then disengages the handle from the shank.

After filling their plate with food from the buffet table, the customer simply disposes of the handle.

The handles can then be taken to the dish washing department where they are properly washed, sanitized and returned to the dining room for reuse.

Should the customer desire to return to the buffet and for additional food, then he or she would use another detachable handle.

A clip or holding member can be provided to hold the first portion of the utensil.

DETAILED DESCRIPTION OF THE INVENTION

Figure 1:
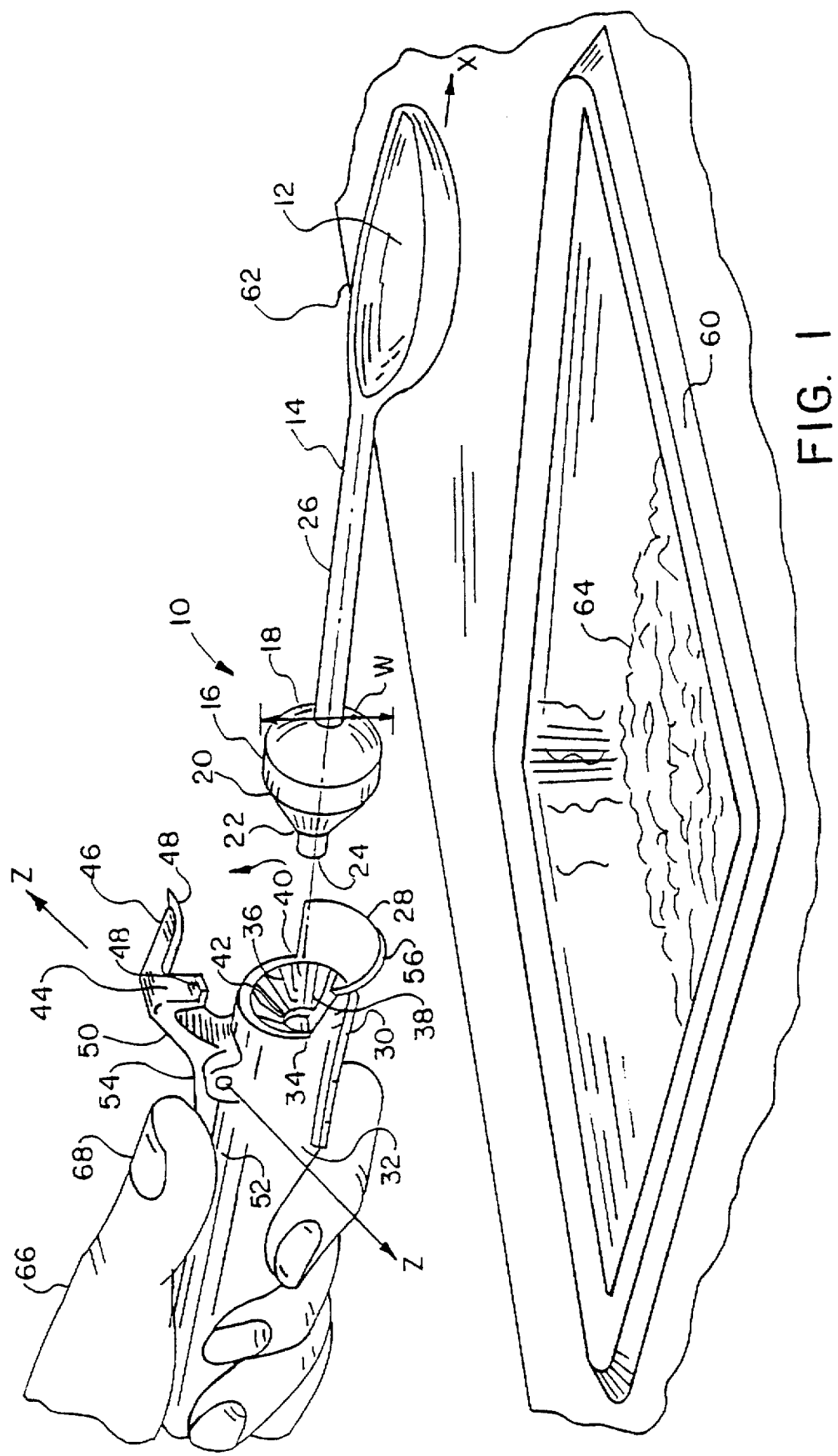
FIG. 1 is a perspective, partially exploded view of a food serving utensil having a removable handle for serving utensils made in accordance with the present invention.
Figure 2:
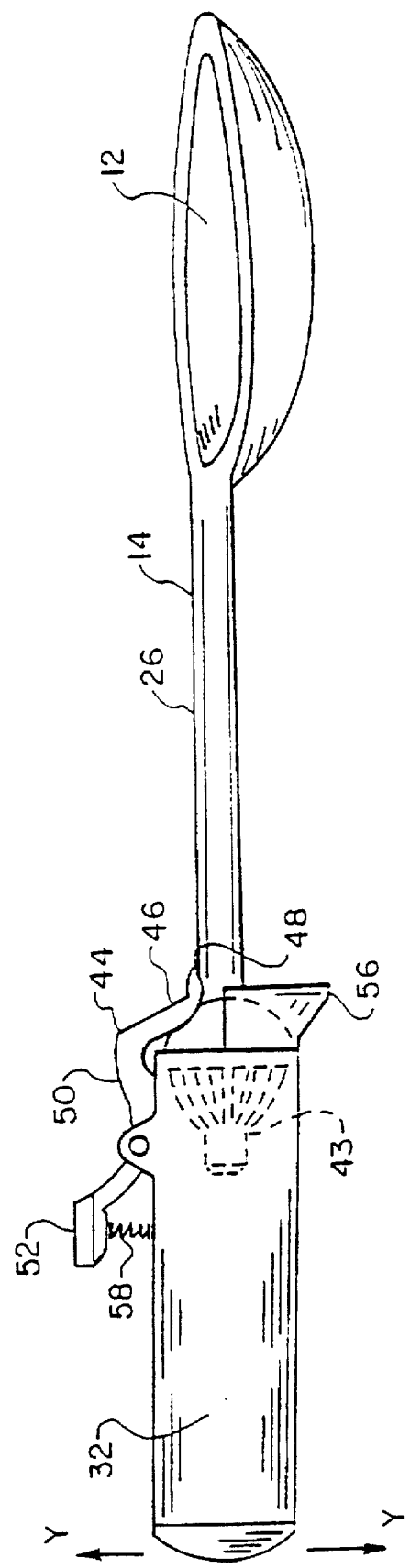
FIG. 2 is a side view of the food serving utensil shown in FIG. 1.
Figure 3:
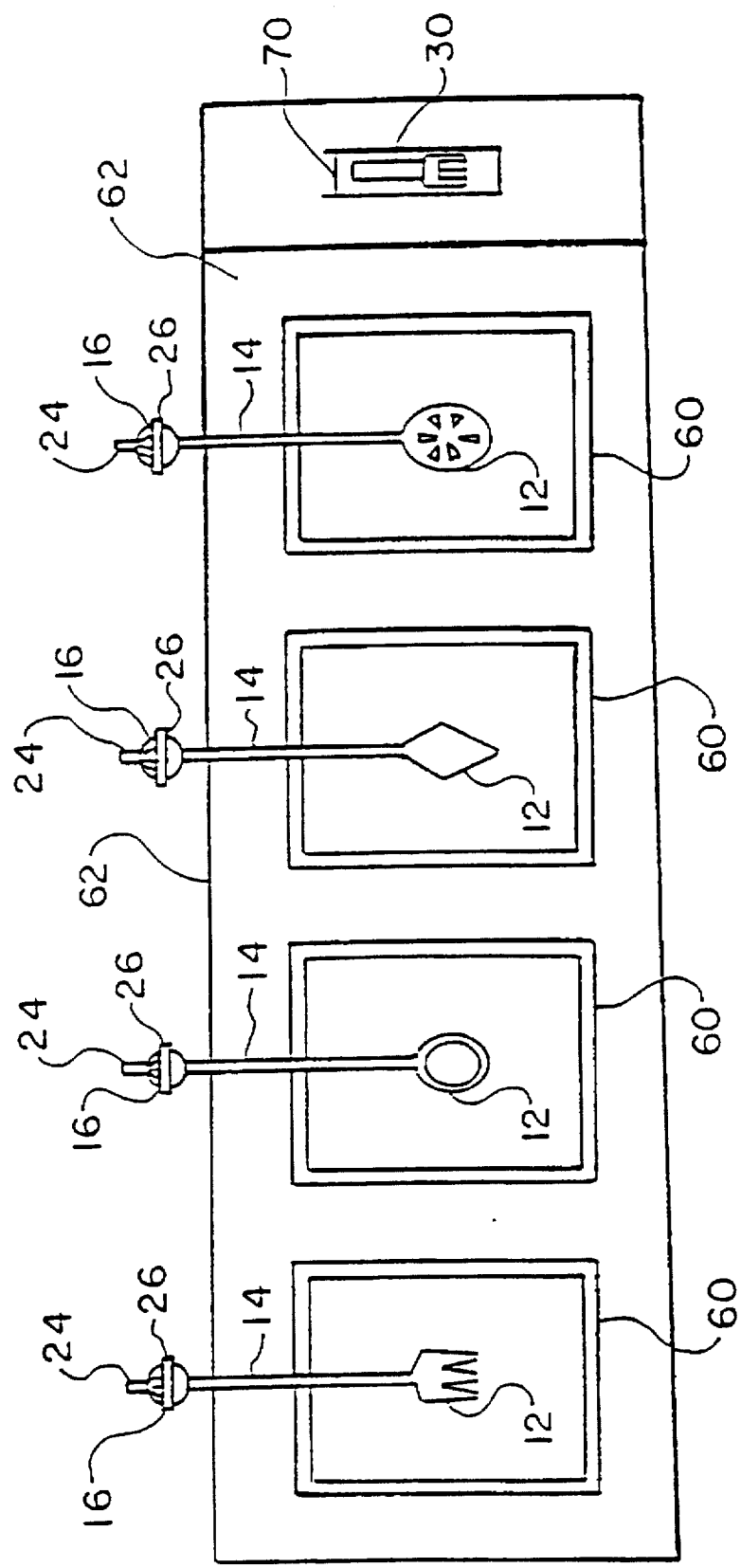
FIG. 3 is a top plan view of a buffet table having a plurality of first portions of food serving utensils made in accordance with the present invention.

FIGS. 1 and 2 show a food serving utensil 10 made in accordance with the present invention. Utensil 10 includes a spoon shaped utensil portion 12 attached to one end of a shank 14. The utensil portion 12 can be spoon shaped, knife shaped, fork shaped or any other utensil shape, as shown in FIG. 3. A splined coupling 16 is included at the other end of the shank 14. The splined coupling 16 includes a frusto-conical smooth surface 18 at the end closest to the utensil portion 12 and a serrated frusto-conical shaped surface 20 at the other end. The surface 20 is defined by a plurality of longitudinally extending teeth 22.

A centering pin 24 extends rearwardly from the surface 20. Splined coupling 16 and centering pin 24 form a male member. The utensil portion 12, the shank 14, the splined coupling 16 and the centering pin 24 form a first portion 26 of the utensil 10. Preferably, the first portion 26 should be made of stainless steel, although other materials can be used.

A second portion 28 of utensil 10 defines a handle 30. The handle includes a handle grip 32 having an open end 34. A splined surface 36 defines a cavity 38 adapted to receive the splined coupling 16 and the centering pin 24. Cavity 38 is defined by a tapered serrated surface 40 defined by a plurality of longitudinally extending teeth 42 terminating at a cylindrical surface 43. A female member of the handle 30 is defined by the portion that includes cavity 38.

A spring loaded clamp 44 is pivotally secured to the handle grip 32. The clamp 44 includes a forked end 46 defined by two spaced apart tines 48 secured to a clamp body 50. The tines 48 form a V-shaped recess. A lever actuator button 52 is secured on an opposite end of the body 50. Two spaced apart lugs 54 extend from the handle grip 32. Aligned holes are provided in the lugs 54 and the body 50 through which a pivot pin passes through so that the clamp 44 is pivotally secured to the handle grip 32. In this arrangement, the forked end 46 is positioned over a flared receiving lip 56, which is positioned forwardly of the cavity 38. A spring 58 is secured to both the lever actuator button 52 and the handle grip 32 so as to spring bias or urge the forked end 46 toward the flared receiving lip 56. Pushing the lever actuator button 52 toward the handle grip 32 causes the body 50 to pivot about the pivot pin, thereby moving the forked end 46 away from the flared receiving lip 56, as shown in FIG. 1. The spring 58 causes the forked end 46 to move toward the lip 56 when the button 52 is released, as shown in FIG. 2.

In operation, each customer is issued a handle 30. Each buffet dish 60 on a buffet table 62 is provided with its own serving utensil first portion 26, which is typically placed within the food 64 contained in the dish 60, as shown in FIG. 3. The handle 30 remains with the customer during their entire trip along the buffet table 62. When the customer reaches a dish 60 and desires to take some of the food from it, he or she grabs the handle 30 with their hand 66 and depresses the button 52 with their thumb 68. This causes the forked end 46 to move away from the lip 56 and places the clamp 44 in an open position. The distance of the tine ends and the lip 56 is greater than the width "W" of the splined coupling 16 when the clamp 44 is in the open position. The handle 30 is then moved by the customer towards the coupling 16 so that it is received within the cavity 38. The button 52 is released and the clamp 44 and the forked end 46 is urged downwardly by the spring 58 so that lower surfaces of tines 48 contact surface 18, placing the clamp 44 in a closed position and causing the surface 20 and the pin 24 to matingly engage with surfaces 40 and 43. The pin 24 and surface 43 center the utensil portion 12 about the longitudinal "X" axis, as well as prevent the pin from rotating about the "Y" and "Z" axes. The mating serrated surfaces 20 and 40 prevent the utensil portion from rotating about the longitudinal "X" axis and the tines 48, which are positioned on opposite sides of the shank 14 and prevent the first portion 26 from sliding out of the handle 30.

The customer then serves himself or herself food 64 by removing the food 64 from the dish 60 and placing the food 64 onto his or her plate in a normal manner (that is by using the utensil portion 12). The customer then places the utensil portion 12 into dish 60, rests the shank 14 against an upper edge of the dish 60, and then depresses the button 52 as described above, thereby placing the clamp 44 in an open position and moving the handle 30 away from the first portion 26, so that the handle 30 can be removed or disengaged from the first portion 26.

The customer continues this process along the buffet table 62 for each dish (which the restaurant has placed food in) using the same handle provided to them. After filling his or her plate with food from the buffet table 62, the customer deposits the handle into a container 70 or gives it to a restaurant employee and returns to their table to enjoy their food. The handles 30 are then washed and sanitized and can be returned to the dining room for reuse. Should the customer wish to return to the buffet table, a new handle 30 can be given to him or her and the above process is repeated. Alternatively, the handles or first portions could be made disposable out of such materials as plastic.

As should be evident, at no time has there been any cross-contamination of the serving utensils or food on the buffet table 62 because only one customer has touched the handle 30 with his or her own hands prior to the handle being washed and sanitized. Hence, this arrangement is a single, effective, aesthetically pleasing and inexpensive solution to prevent cross-contamination of buffet utensils. Further, the restaurant can purchase the first portions 26 and handles 30 as sets or individually, since it is conceivable that more handles 30 would be required by a restaurant, than first portions 26. Also, the male member can be provided on the handle 30 and the female member could be defined on the first portion 26.

Figure 4:
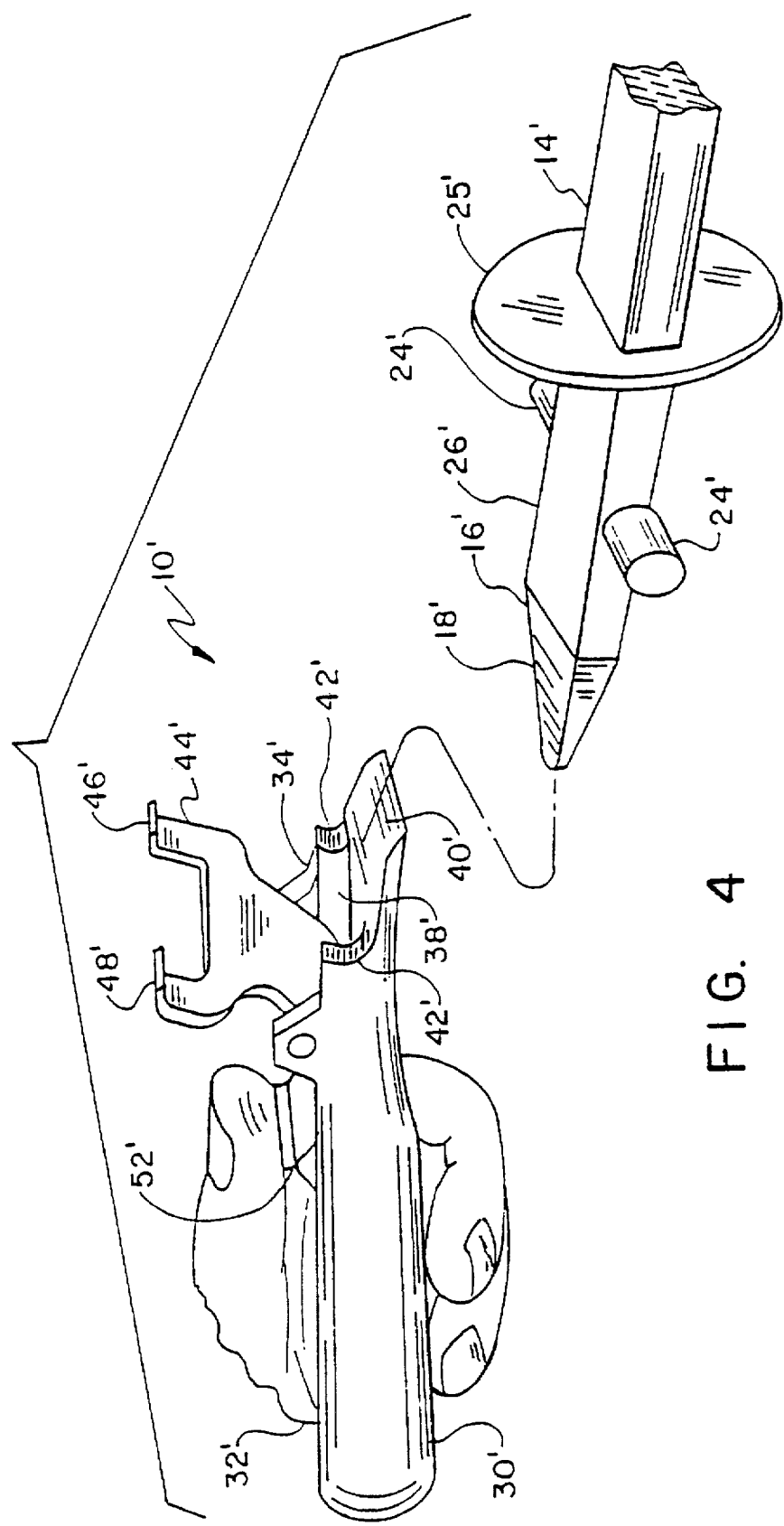
FIG. 4 is an exploded view of a portion of another food serving utensil made in accordance with the present invention.
Figure 5:
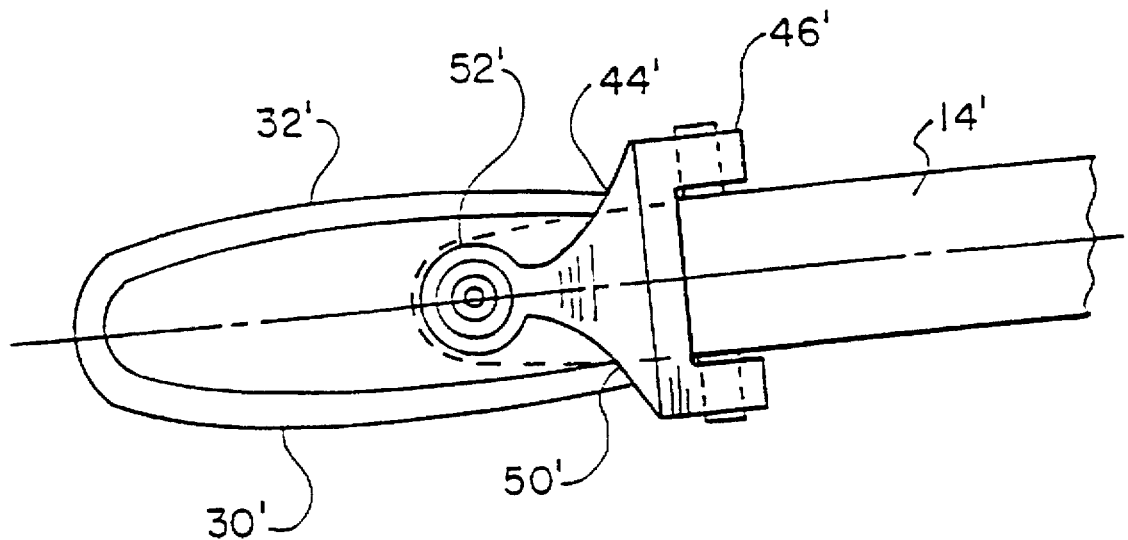
FIG. 5 is a top view of a portion of the food serving utensil shown in FIG. 4.
Figure 6:
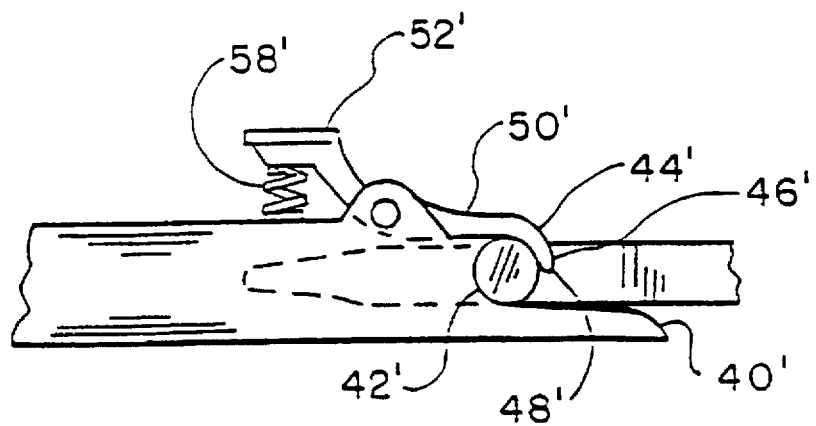
FIG. 6 is a side view of a portion of the food serving utensil shown in FIGS. 4 and 5.

FIGS. 4–6 show another embodiment of a food utensil 10' made in accordance with the present invention. Utensil 10' includes a utensil portion (not shown) such as a spoon shaped utensil 12 attached to one end of a square cross-sectional shaped shank 14'. A tapered coupling 16' having a tapered surface 18' is included at the opposite end of the shank 14'. Two locking pins 24' extend transversely from the shank 14'. A splash guard 25' is provided on the shank forwardly of the pins 24' towards the utensil portion. The utensil portion, shank 14', tapered surface 18' and locking pins 24' form a first portion 26'.

A handle 30' is provided similar to that of handle 30. The handle includes a handle grip 32' having an open end 34'. A substantially rectangular shaped cavity 38' is defined at the open end 34' and is adapted to receive the tapered coupling 16'. A lip 40' extends from the open end 34' and has two surfaces 42' adapted to abut against the pins 24'.

A spring loaded clamp 44' is pivotally secured to the handle grip 32'. The clamp 44' is similar to clamp 44 and includes a forked end 46' defined by two spaced apart tines 48' secured to one end of a clamp body 50'. A lever actuator button 52' is secured on an opposite end of the body 50'. The body 50' is pivotally secured to the handle 30' in the same manner as body 50 is secured to handle 30. A spring 58' is secured to the lever actuator button 52' and the handle 30' so as to spring bias tines 48' towards lip 40'.

The utensil 10' operates in the same manner as utensil 10. Specifically, a customer pushes down on button 52' and moves the handle 30' towards the coupling 16' so that it is received in the cavity 38'. The button 52' is then released and the tines 48' contact pins 24', so that the pins 24' are sandwiched between tines 48' and the lip 40'.

The utensil 10' can be used in the same manner as utensil 10, and after the customer finishes taking food, the handle 30' can be removed by depressing button 52' and moving the handle 30' away from the coupling 16'.

Figure 7:
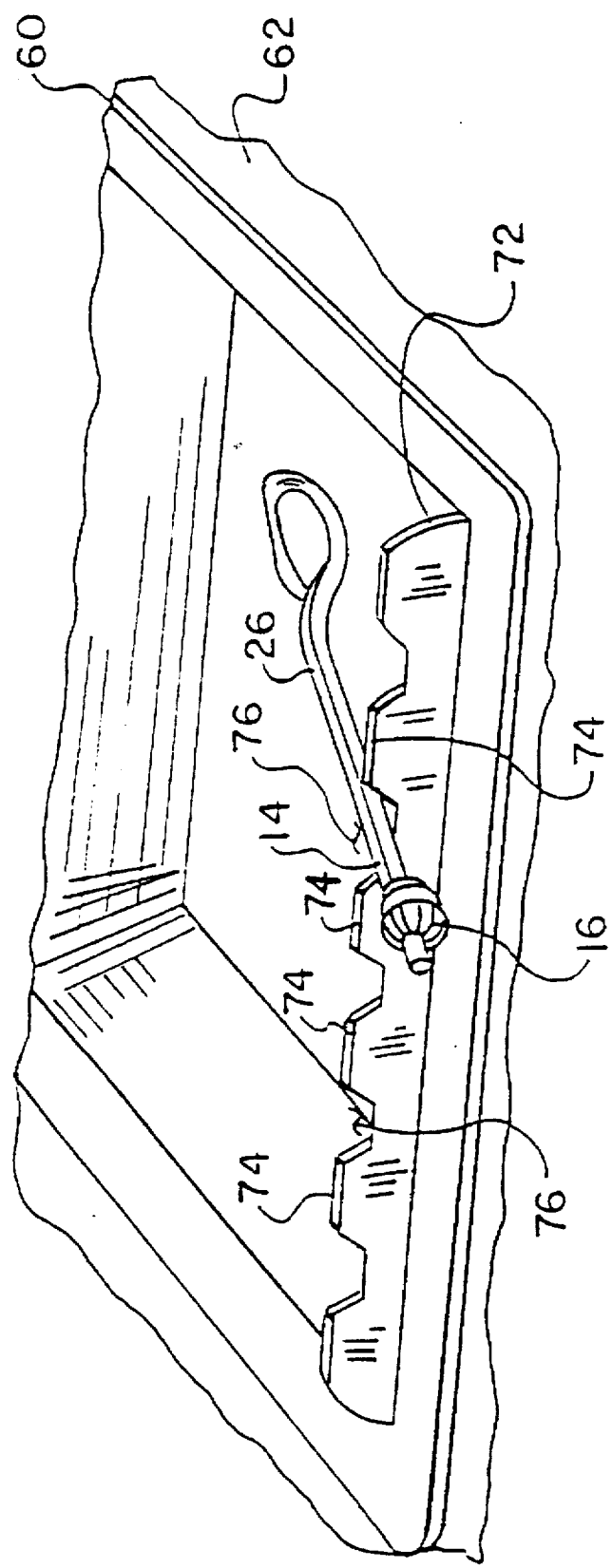
FIG. 7 is a top perspective view showing a holder, buffet dish and utensil first portion shown in FIG. 1 made in accordance with the present invention.

Although, as previously described, the first portion 26 can rest against an upper edge of the dish 60 when it is not secured to a handle 30, there is always a possibility that the first portion 26 can fall into the food 64 contained in the dish 60. To overcome this problem, a holder 72 can be provided as shown in FIG. 7. Holder 72 includes a plurality of spaced tabs 74 defining retaining recesses 76. Holder 72 is adapted to coact with the dish 60, that is it can be secured to the dish 60 by being clipped or welded to the dish, sandwiched between the dish 60 and the table 62 or secured to the table 62 in close proximity to the dish 60. The width of each retaining recess is less than the width "W" of the splined coupling 16 but greater than the shank width 14. The holder 72 can be removably or permanently attached to the dish 60, and preferably, the holder is made of stainless steel or plastic.

In operation, after the customer uses the utensil 10, then he or she places the shank 14 in any of the retaining recesses 76 so that the utensil portion 12 is positioned within the dish 60. The customer then disengages the handle 30 and removes it from the first portion 26 as previously discussed. The next customer who desires food 64 from the dish 60 engages his or her handle 30 with the splined coupling 16. During engagement, the smooth frusto-conical portion 18 of the splined coupling 16 abuts against the adjacent tabs 74 to assist engagement of the handle 30. The tabs 74 prevent the first portion 26 from falling within the food 64 during this process. After the customer takes his or her food 64 from the dish 60, then the customer disengages the handle 30 from the first portion 26 as previously discussed. The holder can also be used with the second utensil 10'.

Figure 8:
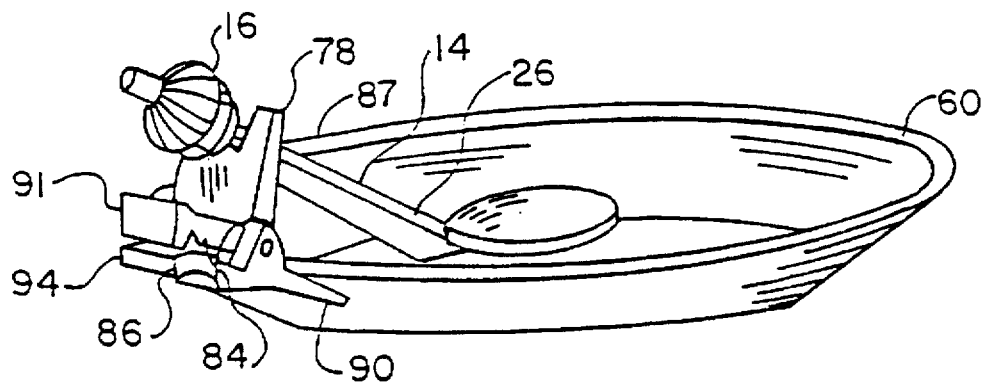
FIG. 8 is a top perspective view of a clip, a buffet dish and a utensil first portion as shown in FIG. 1 made in accordance with the present invention.
Figure 9:
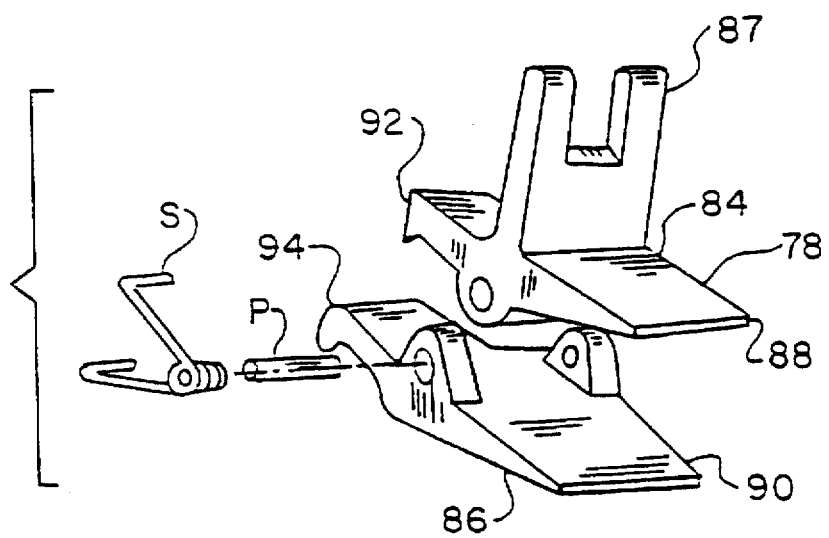
FIG. 9 is an exploded view of the clip shown in FIG. 8.

Alteratively, the buffets can be provided with utensil retaining clips 78, 80, 82, 102, 104 and 106. As shown in FIGS. 8 and 9, clip 78 includes an upper half 84 and a lower half 86. The upper half includes a utensil support 87 defined by two spaced apart tabs defining a shank receiving recess. A pivot pin "P" pivotally secures the upper half 84 to the lower half 86. A spring "S" is received between the upper half 84 and the lower half 86 so as to spring bias forward edges 88 and 90 of the clip 78. The clip tabs are spaced apart less than the distance "W" but greater than the diameter of the shank 14. Ends 92 and 94 of clip 78 are adapted to be pushed towards each other by a restaurant worker so that forward edges 88 and 90 are spaced apart. The edges 88 and 90 are then placed over a dish edge as shown in FIG. 8. The ends 92 and 94 are released so that edges 88 and 90 are urged by the spring "S" in a closed position and contact the dish edge so as to removably secure the clip 78 to the dish 60. The first portion 26 is adapted to rest on the clip 78 and be received between the tabs in the same manner as holder 72. Clip 78 can be manufactured out of metal, such as stainless steel, or plastic.

Figure 10:
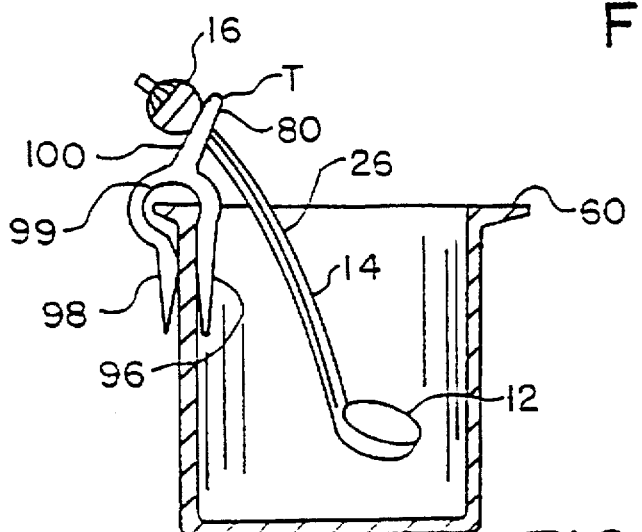
FIG. 10 is a side view partially in section showing a buffet dish, a clip and a utensil first portion made in accordance with the present invention.
Figure 11:
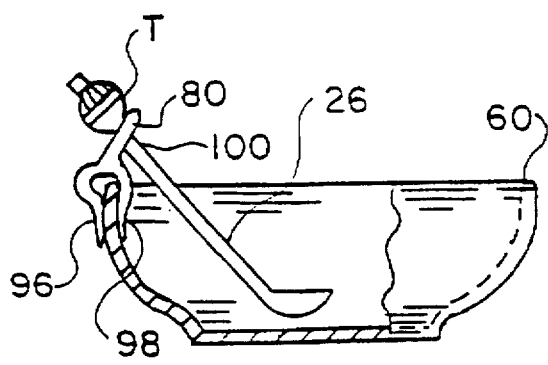
FIG. 11 is a side view partially in section of the clip shown in FIG. 10 with another buffet dish.
Figure 12:
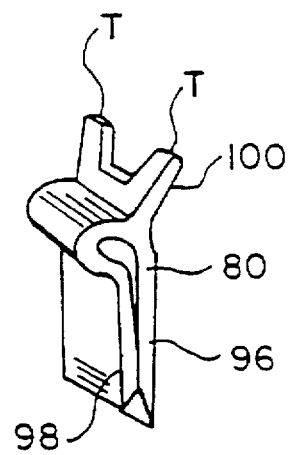
FIG. 12 is a perspective top view of the clip shown in FIGS. 10 and 11.

As shown in FIGS. 10–12 and 15B, clip 80 includes a unitary body having two legs 96 and 98 having an upper portion 100. Upper portion 100 includes two spaced apart tabs "T" and is similar to utensil support 87. The clip is made of a spring-like material, either plastic or metal, such as stainless steel. The legs 96 and 98 can be sufficiently spread apart to receive an edge of a dish 60 as shown in FIGS. 10 and 11. A recess 99 is defined by upper portions of legs 96 and 98 of the clip 80, which permits the clip 80 to be received by different shaped dish edges. The legs 96 and 98 abut against the dish surface when the clip 80 is engaged with the dish 60. Clip 80 coacts with the utensil 10 in the same manner as clip 78.

Figure 13:
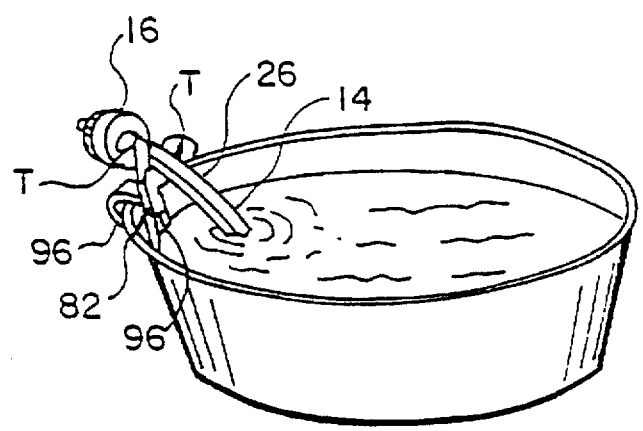
FIG. 13 is a top perspective view of a clip, a buffet dish and a utensil first portion made in accordance with the present invention.
Figure 14:
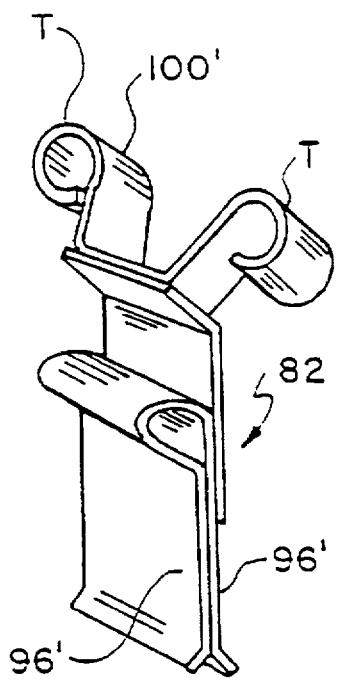
FIG. 14 is a top perspective view of the clip shown in FIG. 13.

As shown in FIGS. 13 and 14, clip 82 is similar to clip 80 and includes two legs 96' and 98' and an upper portion 100'. The upper portion includes two spaced apart tabs "T" having rolled upper portions. Clip 82 can be made of either plastic or metal. Like clip 80, the clip removably fastens onto the edge of the dish 60 with a portion of the dish 60 sandwiched between legs 96' and 98'.

Figures 15A, 15B, 15C:
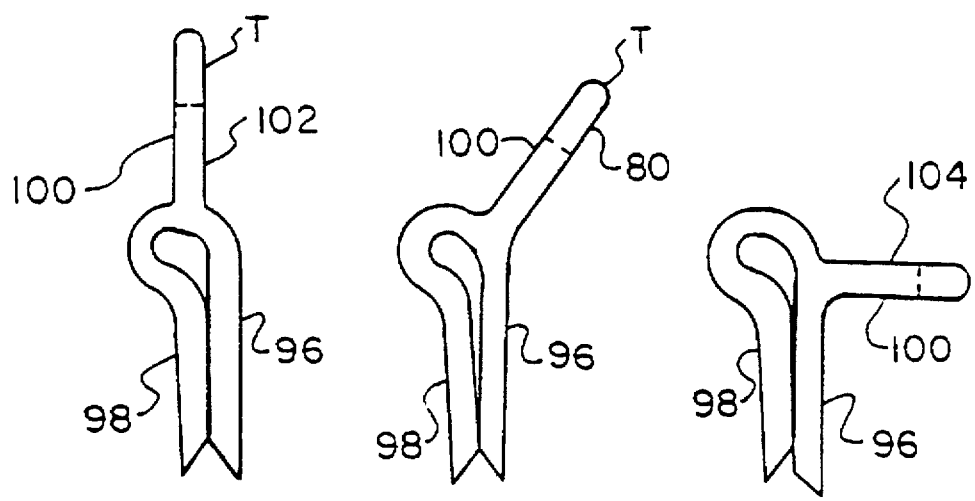
FIG. 15A is a side view of a clip similar to that shown in FIGS. 10–12.
FIG. 15B is a side view of the clip shown in FIGS. 10–12.
FIG. 15C is a side view of a clip similar to the clip shown in FIGS. 10–12.

As shown in FIGS. 15A and 15C, clips 102 and 104 are similar to the clip 80 shown in FIGS. 10–12 and 15B with the exception of the orientation of the upper portion 100.

Figure 16:
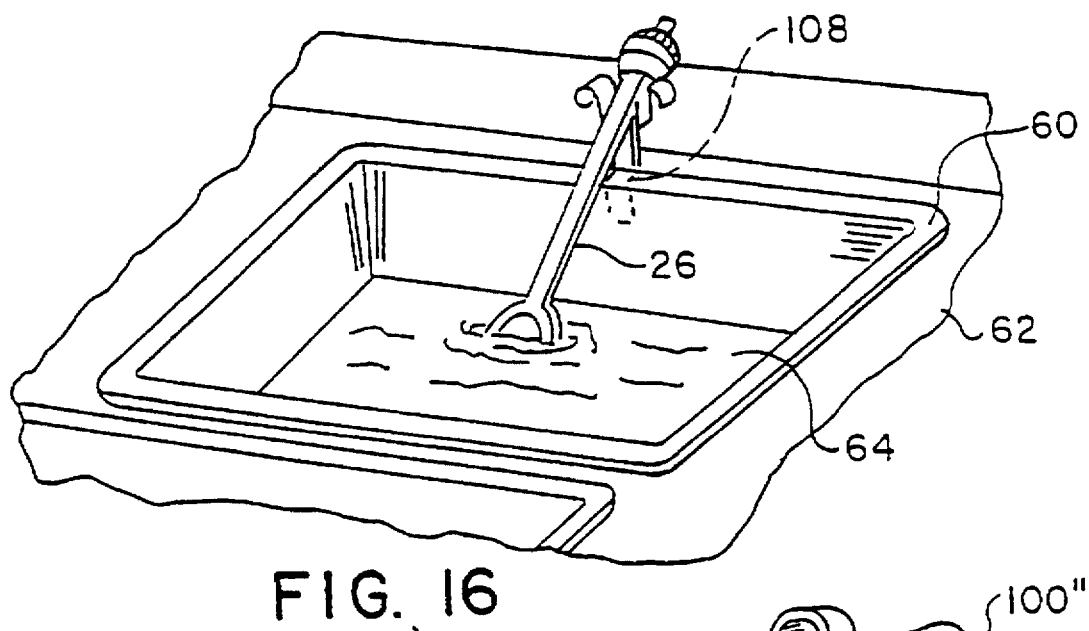
FIG. 16 is a top perspective view of a clip, a buffet dish and a utensil first portion made in accordance with the present invention.
Figure 17:
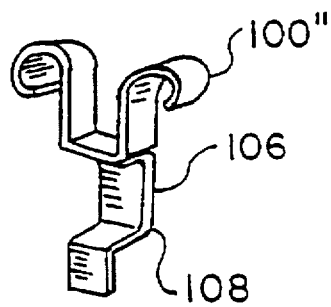
FIG. 17 is a top perspective view of the clip shown in FIG. 16.

FIGS. 16 and 17 show another clip 106 having an upper portion 100" similar to upper portion 100' of clip 82. A lower portion 108 of the clip is adapted to be sandwiched between the dish 60 and the buffet table 62. As shown in FIGS. 14 and 17, clips 82 and 106 are made from various sections which are attached to each other by welding, gluing or fasteners. Also, clips 82 and 106 can be made as one integral piece by injection molding or bending sheet metal.

Figure 18:
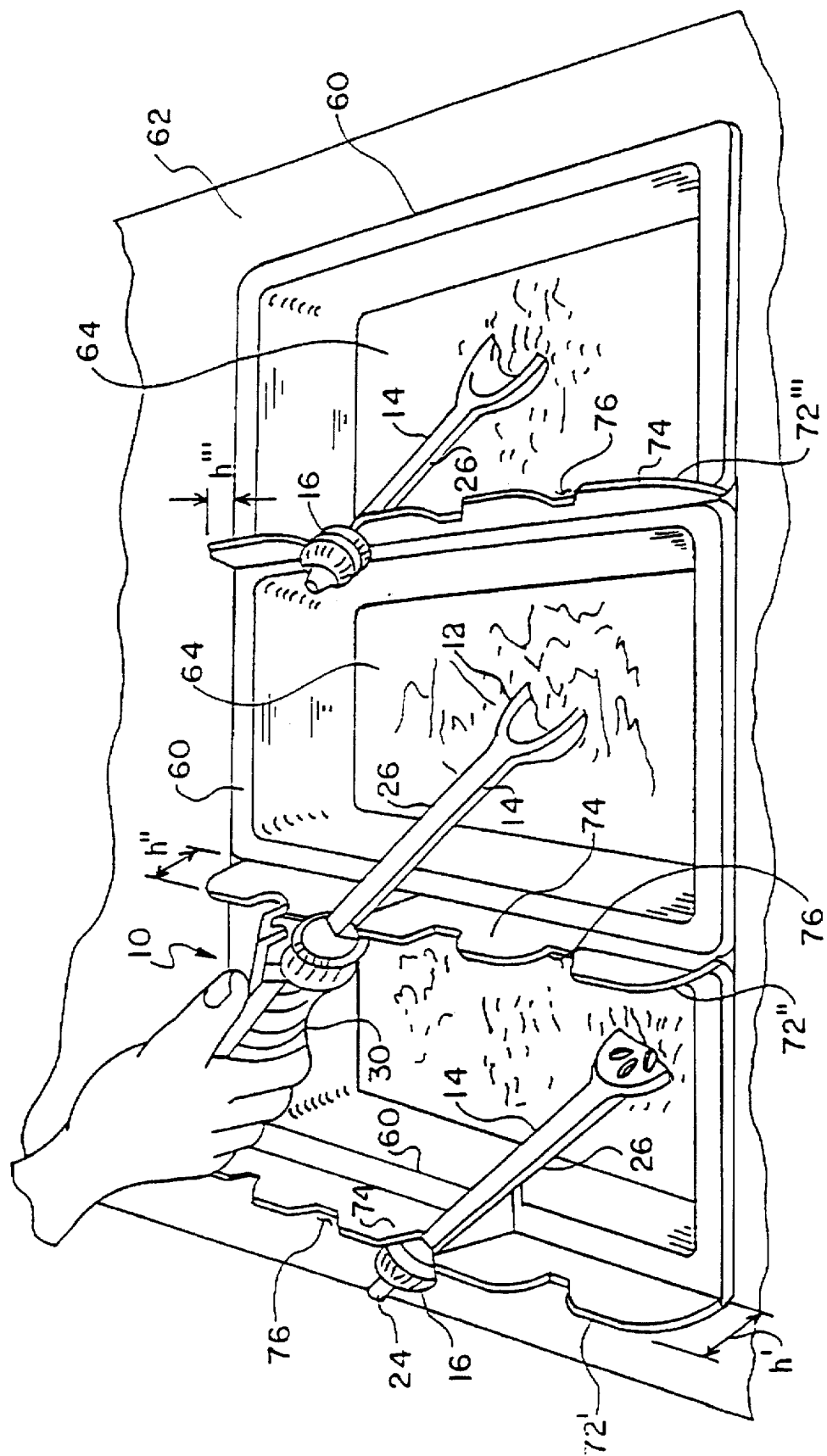
FIG. 18 is a top perspective view of a buffet table, buffet dishes, utensil first portions and utensil first portion holders made in accordance with the present invention.

FIG. 18 shows a buffet table having a plurality of dishes 60 with three holders 72', 72" and 72'" of varying heights h', h″ and h‴, where h′ is greater than h″, which is greater than h‴. The varying heights of the holders 72 minimizes the chances of inadvertent knocking of the first portions 26 into the dishes 60.

Figure 19:
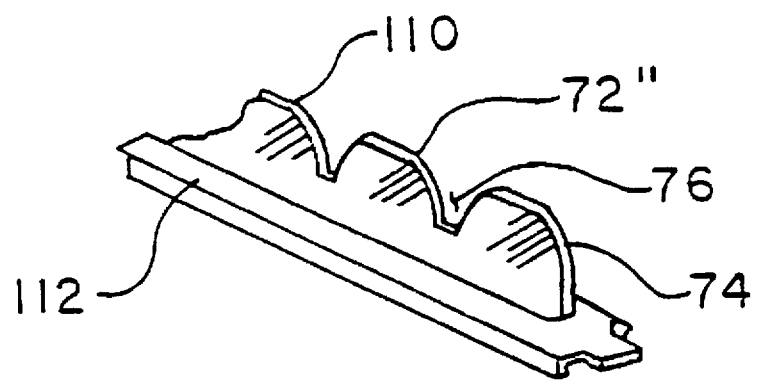
FIG. 19 is a top perspective view of one of the holders shown in FIG. 18.

FIG. 19 shows holders 72″ and 72‴ that include an upper portion 110 and a lower portion 112 having two spaced apart legs and a base to which the upper portion is welded.

Figure 20:
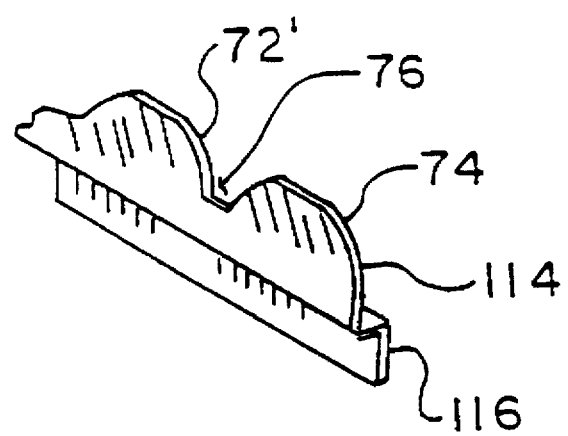
FIG. 20 is a top perspective view of a portion of another one of the holders shown in FIG. 18.

FIG. 20 shows holder 72′ including an upper portion 114 and an integral bent portion 116. The holders 72′, 72″ and 72‴ are adapted to be sandwiched between the dishes 60 and table 62.

The holders 72, 72′, 72″ and 72‴ and clips 78, 80 82, 102, 104 and 106 can be used individually or in any combination in conjunction with the buffet table 62 and dishes 60 and utensils 10 and 10′. Preferably, holders are used with dishes 60 containing hot food and clips are used with dishes containing cold food. The holders and clips can be made from plastic or metal, such as stainless steel.

Various modifications can be made to the subject invention and fall within the scope of the following claims.

I claim:

1. A utensil comprising:
    a utensil portion for serving food;
    a shank having a first end and a second end, said utensil portion attached to said shank first end; and
    a handle releasably secured to said shank second end by a clamp secured to said handle, said shank second end including one of a male member and a female member, and said handle including the other of a male member and a female member, said male member received by said female member, wherein said male member includes a serrated surface and said female member includes a serrated surface which is adapted to mate with said male member serrated surface.

2. A utensil as claimed in claim 1, wherein said shank includes said male member and said handle includes said female member, said male member further includes a centering pin adapted to be received in a centering pin recess defined within said handle.

3. A utensil as claimed in claim 1, wherein at least one of said utensil portion and handle is disposable.

4. A utensil as claimed in claim 1, further comprising a spring secured to said clamp so as to bias said clamp in a closed position.

5. A utensil as claimed in claim 1, wherein said clamp includes a body having a forked end adapted to contact said shank, said body being pivotally secured to said handle.

6. A utensil as claimed in claim 5, further comprising a spring secured to said clamp so as to urge said clamp in a closed position.

7. A utensil as claimed in claim 6, further comprising a lever actuator button secured to said body and adapted to be pressed in a downwardly direction so as to force said forked end in an upwardly direction, thereby placing said clamp in an opened position.

8. A utensil as claimed in claim 1, wherein said handle has an open end with a lip positioned adjacent thereto adapted to receive said shank second end.

9. A utensil as claimed in claim 1, wherein said utensil portion consists from the group of a spoon shape, a fork shape and a knife shape.

10. A combination food buffet table arrangement comprising:
    a buffet table;
    at least one buffet dish adapted to contain food positioned on said buffet table; and
    a utensil comprising:
        a utensil portion for serving food;
        a shank having a first end and a second end, said utensil portion attached to said shank first end; and
        a handle releasably secured to said shank second end by a clamp secured to said handle, said shank second end includes one of a male member and a female member, and said handle includes the other of a male member and a female member, said male member received by said female member, wherein said male member includes a serrated surface and said female member includes a serrated surface which is adapted to mate with said male member serrated surface.

11. A combination food buffet table arrangement as claimed in claim 10; further comprising a plurality of buffet dishes adapted to contain food positioned on said buffet table, each of said buffet dishes receiving a first portion of a utensil, each first portion of a utensil includes a utensil portion for serving food and a shank having a first end and a second end, said first end attached to the utensil portion and the second end adapted to be removably secured to said handle.

12. A handle for removably securing to a first portion of a utensil including a utensil portion for serving food and a shank having a first end and a second end, the shank first end attached to the utensil portion and the shank second end having a splined coupling, said handle comprising:
    a handle grip having a splined coupling receiving cavity formed therein and a clamp secured to said handle, said clamp includes a body having a forked end adapted to engage said shank, whereby the splined coupling is adapted to be received within said cavity and said clamp is adapted to engage said shank.

13. A combination food buffet table arrangement as claimed in claim 10, further comprising:
    a utensil holding member adapted to coact with said buffet dish and adapted to receive said utensil first portion.

14. A combination food buffet table arrangement claimed in claim 13, wherein said holding member comprises a clip having a utensil supporting section defined by two spaced apart tabs, said utensil supporting section adapted to receive said shank between said tabs.

15. A utensil as claimed in claim 1, wherein said shank second end is tapered and a pin extends from said shank, said second end and said pin adapted to coact with said handle.

16. A utensil comprising:
    a utensil portion for serving food;
    a shank having a first end and a second end, said utensil portion attached to said shank first end;
    a handle releasably secured to said shank second end; and
    a clamp secured to said handle, said clamp adapted to releasably secure said shank to said handle, wherein said clamp includes a body having a forked end adapted to contact said shank, said body being pivotally secured to said handle.

17. A utensil as claimed in claim 16, further comprising a spring secured to said clamp so as to urge said clamp in a closed position.

18. A utensil as claimed in claim 17, further comprising a lever actuator button secured to said body and adapted to be pressed in a downwardly direction so as to force said forked end in an upwardly direction, thereby placing said clamp in an opened position.

19. A utensil for use in a food buffet comprising:
    a utensil portion for serving food;

a shank extending in a longitudinal direction having a first end and a second end having a serrated surface, said utensil portion attached to said shank first end; and a handle having a movable member releasably secured to said shank, said movable member rotatable about an axis perpendicular to the longitudinal axis, said handle having a serrated surface matingly engaged with said shank second end serrated surface, whereby when said movable member is moved toward said shank and engages said serrated surfaces mate with each other forming a utensil and whereby when said movable handle is moved away from said shank said shank is released from said handle, wherein said utensil portion is adapted to be releasable from said handle using only one hand which is holding said handle.

20. A utensil as claimed in claim 19, wherein said movable member is biased.

21. A utensil as claimed in claim 19, wherein said handle can be engaged with said shank in various positions about the longitudinal axis.

22. A utensil as claimed in claim 19, further comprising a splash guard extending from said shank and positioned between said first end and said second end.

* * * * *